July 3, 1951

J. W. PRATT 2,558,876

UPPER TRIMMING MACHINE

Filed April 11, 1950

Inventor
John W. Pratt
By his Attorney

Patented July 3, 1951

2,558,876

UNITED STATES PATENT OFFICE 2,558,876

UPPER TRIMMING MACHINE

John William Pratt, Leicester, England, assignor to United Shoe Machinery Corporation, Flemington, N. J., a corporation of New Jersey Application April 11, 1950, Serial No. 155,296
In Great Britain July 9, 1949

3 Claims. (Cl. 12—83.5)

This invention relates to a trimming machine and, more particularly, to a machine for trimming surplus marginal material from footwear or other work as it is fed progressively to the operating instrumentalities. While the invention is hereinafter illustrated as embodied in a machine for performing a trimming operation on that portion of a shoe upper which has been lasted over the margin of an insole on the bottom of a last, it will be appreciated that its use is not necessarily so limited.

Adjacent to the locality where the upper is secured to the insole, it is desirable to trim away the upwardly projecting surplus upper leather and lining material in order to produce a shoe with a flat and smooth bottom ready for attachment of an outsole thereto. Removal of the unwanted marginal material, which may include stiffening plies, is made difficult by pleats or other irregularities in the work which obstruct its feeding movement. It is found, however, that the trimming may be accomplished by slitting the unsecured margin as it is moved along between a rotary cutting tool and a cooperative shearing member stationed in tangential relation, the effectiveness of this organization in operating on various types of flexible material having differing thickness and toughness being enhanced by novel work engaging means hereinafter disclosed.

A principal object of the invention is to provide an improved trimming machine for operating on lasted uppers, said machine to be simple and relatively inexpensive in design, readily operable without special skill on the part of the operator and capable of rapidly turning out smoothly trimmed uppers.

In accordance with this object one feature of the invention is the combination in a shoe trimming machine of a rotary cutting tool and a cooperative shearing member, both of these elements also fulfilling functions additional to their normal purpose, i. e. the tool being adapted to aid in feeding the work during trimming and the member, as herein exemplified, being formed as a finger to act as a guard and as a work gage by engaging the insole and the unsecured upper adjacent thereto.

A further feature of the invention resides in providing in a trimming machine of the type described in combination with said rotary cutter and shearing finger a freely rotatable guide disk disposed to engage the margin of the upper ahead of the finger and conveniently guide progressive unsecured portions to the shearing locality of the finger and cutter.

Figure 1:
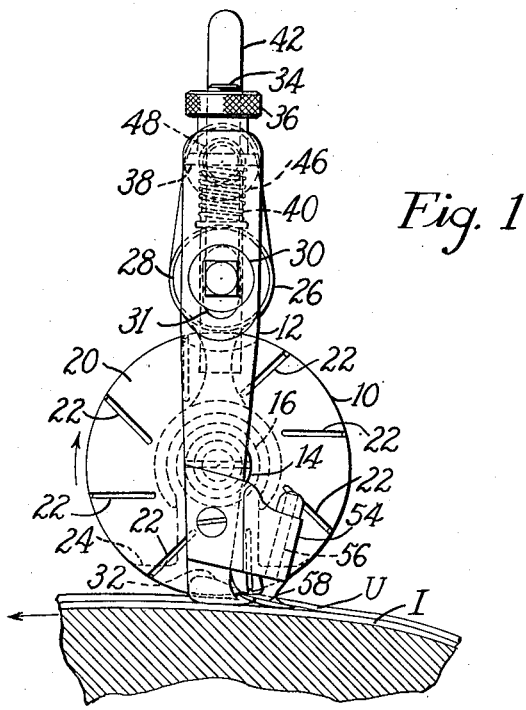
Figure 2:
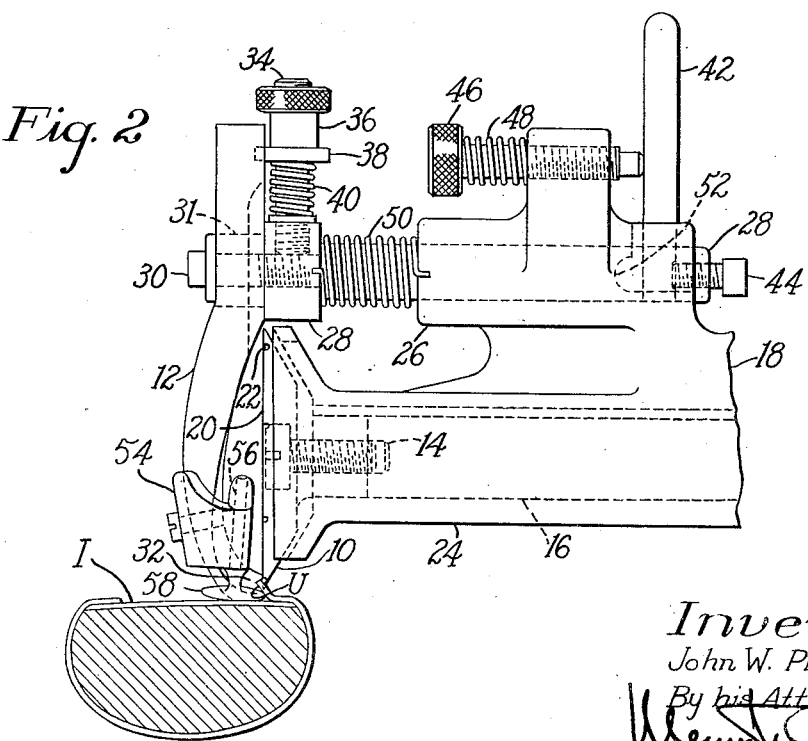

The above features as well as others involved in various details of construction and combinations of parts will now be more particularly set forth in connection with the accompanying drawings, in which Fig. 1 is a front elevation of a portion of an illustrative upper trimming machine embodying the present invention and shows a longitudinal section of a portion of a lasted shoe in operative position; and Fig. 2 is a side elevation of that portion of the machine seen in Fig. 1, the shoe being shown in transverse section.

The operating instrumentalities of the illustrative machine comprise a power driven cutting tool in the form of a rotary disk cutter 10 and a cooperative member in the form of a stationary finger 12 later to be more fully described. The cutter 10 is truncate and affixed by a bolt 14 to one end of a horizontal drive shaft 16 (Fig. 2) mounted in a suitable bearing (not shown) in a head casting 18. The cutter 10 has a sharp circular cutting edge as defined by the intersection of its vertical face 20 with its conical exterior. Means (not shown) are provided in the machine to rotate the shaft 16 and cutter 10 in the direction indicated by an arrow in Fig. 1, the work being manually fed during operation of the machine along the direction also shown by an arrow in that figure.

For a purpose hereinafter explained, shallow grooves 22 (Fig. 1) formed in the face 20 extend to the cutting edge. The grooves 22 are preferably equally inclined to tangents passing through their respective points of intersection with the disk cutter perimeter.

Except for an exposed lower portion to which the work will be presented, the cutter and its shaft are preferably enclosed by an inverted U-shaped guard 24 secured to the head casting 18. Means are provided above the guard and supported thereby for conveniently mounting and adjusting the aforesaid finger 12 in relation to the cutter 10. Thus, a lug 26 has formed therein a bore extending parallel to the shaft 16 for receiving a rod 28, the latter being both rotatable and slidable in said bore to a limited extent as will presently be seen. The finger 12 is secured to the enlarged lefthand end of the rod 28 (as viewed in Fig. 2), a bolt 30 extending through an elongated slot 31 formed in the finger 12 normally to hold the latter and the rod 28 in relatively fixed position. A lower portion of the finger projects toward the operative edge of the cutter face 20 and is tangent thereto, the upper surface of this portion constituting a shearing face 32.

For the purpose of adjusting the finger 12 in suitable heightwise position to maintain its shearing face 32 in cooperative shearing relation with the operative cutting edge of the cutter 10, a threaded stem 34 is fixed in the aforementioned enlarged end of the rod 28. The stem 34 carries an adjusting nut 36 on which is formed a flange 38 engaging a recess in the guide finger. A compression spring 40 mounted on the stem 34 aids in holding the flange steadily in the recess. Rotation of the nut 36 accordingly raises or lowers the flange 38 to lift or lower the shearing face 32 as conditions may require.

With a view to maintaining an edge of the shearing face 32 in light contact with the face 20 of the cutter 10, the righthand end of the rod 28 has an arm 42 secured thereto as by a bolt 44 (Fig. 2). An adjusting screw 46 threaded through an upper portion of the lug 26 bears endwise against the arm 42 when in its upright position, and a compression spring 48 located between the lug and the head of the screw 46 serves to take up endwise play. Mounted on the rod 28 with its ends affixed respectively in a face of the lug 26 and in the enlarged end portion of the rod is a torsion and compression spring 50 (Fig. 2) which, by reason of its compression, normally holds the arm 42 in engagement with the screw 46. It will be apparent that by rotation of the screw 46, endwise movement of the rod 28 may be effected against the action of the spring 50 to carry the shearing face 32 of the finger toward the disk cutter and into tangential relation therewith.

In order to facilitate removal of the cutter 10 from the machine for resharpening, the finger 12 may be swung upwardly about the rod 28 and against the torsional resistance of the spring 50. A horizontal groove 52 (Fig. 2) in the right hand end face of the lug 26 is adapted to receive the arm 42 when it is turned by movement of the finger to such inoperative position, the spring 50 acting to hold the arm in the groove 52 while the finger is retained in its elevated position. When released by the operator the spring 50 returns the finger to its operative position.

It will be noted that the stationary depending finger 12 is convex with respect to the disk knife 10 thereby partially guarding an operator and his work against harmful contact with the rotating cutter. The foot of the finger 12 has a smooth configuration including a rounded bottom adapted for progressive frictional engagement with an insole I, and an upper surface constituting the aforementioned shearing face 32 which inclines upwardly from its relatively thin leading edge.

In the preferred form of the machine illustrative of the invention a bracket 54 secured to the finger 12 extends to the right (as seen in Fig. 1) to provide a bearing for a spindle 56 freely rotatable therein and vertically inclined toward the shearing face 32. Formed on the lower end of the spindle is a thin guide disk 58 preferably about ⅜ of an inch in diameter. The disk 58 has its smooth bottom and upper surfaces slightly rounded to accentuate the thinness of its perimeter, the lower convex surface inclining upwardly from its right or leading edge (as seen in Fig. 1) to overlie the leading edge of the shearing face 32. As will be seen in Fig. 2 the perimeter of the guide disk 58 is preferably also tangent to the plane of the face 20 of the cutter 10. Accordingly the bottom of the guide disk 58 is virtually an extension of the lower face of the guide finger 12 and is adapted to engage the face of the insole I while the upper surface of the guide disk may engage the underside of the surplus upper material designated U.

In operating the machine the insole I is normally maintained in engagement with the bottom of the finger 12 as the shoe is progressively fed so that successive portions of the surplus upper are engaged by the guide disk 58. The latter, being free to rotate in either direction as urged by contact with the insole and/or the unsecured lip of the lasting margin, serves as a fender to avoid snagging of the work. By reason of its incline the disk 58 also lifts the lip from the insole to position it upon the shearing face 32 for the cutting action of the cutter 10. As an aid in guiding the work along, that portion of the perimeter of the guide disk 58 which is in tangential relation to the face 20 is kept close to the apex of the angle formed by the insole I and the unsecured upper material. As the upper approaches the shearing locality the grooves 22 act consecutively to drag the marginal material, thereby aiding the operator in feeding the work. It will be recognized that the compact arrangement permits trimming to be effected where the radius of curvature is small as in the toe portions of women's shoes, and further that pleats or other irregularities in the uppers (which might otherwise impede work feeding) are satisfactorily avoided as the trimming progresses.

Having described my invention, what I claim as new and desire to secure by Letters Patent of the United States is:

1. A machine for trimming a lasted shoe upper comprising a rotary cutting tool, a member having a projecting foot portion the bottom of which is adapted progressively to engage an insole and the upper face of which is arranged in shearing relation to said tool, and a rotatable guide disk supported for engagement with the insole ahead of said member, the upper surface of said disk being adapted for progressive engagement with the underside of the unsecured margin of a lasted upper and inclined upwardly to position said margin between the face of said foot portion and said tool.

2. A trimming machine for operating on the marginal upper material in a lasted shoe comprising trimming means including a rotary disk cutter and a cooperative shearing finger having a foot portion, said cutter having a work-engaging face provided with radial grooves adapted to aid in moving the work progressively between the cutter and said finger, and a guide disk supported for free rotation adjacent to the foot portion of said finger, said guide disk having a convex face substantially tangent to both the plane of the work-engaging face of the cutter and the leading edge of said foot portion.

3. A trimming machine for operating on marginal material overlying the insole of a lasted shoe comprising a rotary cutter and a cooperative finger normally arranged in shearing relation, and a disc in advance of the finger and disposed progressively to lift the marginal material onto an upper portion of the finger when a lower portion thereof engages the insole.

JOHN WILLIAM PRATT.

REFERENCES CITED

The following references are of record in the file of this patent:

UNITED STATES PATENTS

| Number | Name | Date |
| --- | --- | --- |
| 2,173,176 | Matheu | Sept. 19, 1939 |
| 2,504,957 | Baker | Apr. 25, 1950 |